US011937623B2

(12) United States Patent
Bergwerff et al.

(10) Patent No.: US 11,937,623 B2
(45) Date of Patent: Mar. 26, 2024

(54) PROCESS FOR THE MANUFACTURE OF AN AQUEOUS DISPERSION COMPRISING MUSTARD BRAN AND AQUEOUS DISPERSION COMPRISING MUSTARD BRAN

(71) Applicant: Conopco, Inc., Englewood Cliffs, NJ (US)

(72) Inventors: Edwin Bergwerff, Vlaardingen (NL); Jadwiga Malgorzata Bialek, Bedford (GB); Stephan Georg Schumm, Rotterdam (NL); Jacob Nijsse, Barendrecht (NL)

(73) Assignee: Conopco, Inc., Englewood Cliffs, NJ (US)

( * ) Notice: Subject to any disclaimer, the term of this patent is extended or adjusted under 35 U.S.C. 154(b) by 69 days.

(21) Appl. No.: 15/772,829

(22) PCT Filed: Nov. 2, 2016

(86) PCT No.: PCT/EP2016/076328
§ 371 (c)(1),
(2) Date: May 2, 2018

(87) PCT Pub. No.: WO2017/080872
PCT Pub. Date: May 18, 2017

(65) Prior Publication Data
US 2018/0317535 A1 Nov. 8, 2018

(30) Foreign Application Priority Data
Nov. 13, 2015 (EP) ..................... 15194462

(51) Int. Cl.
*A23L 29/238* (2016.01)
*A23L 27/60* (2016.01)
*A23L 29/10* (2016.01)
*A23L 29/206* (2016.01)

(52) U.S. Cl.
CPC ............. *A23L 29/238* (2016.08); *A23L 27/60* (2016.08); *A23L 29/10* (2016.08); *A23L 29/206* (2016.08); *A23V 2002/00* (2013.01); *A23V 2200/124* (2013.01); *A23V 2250/022* (2013.01); *A23V 2250/2044* (2013.01); *A23V 2250/5106* (2013.01); *A23V 2300/26* (2013.01); *A23V 2300/41* (2013.01); *A23V 2300/46* (2013.01)

(58) Field of Classification Search
None
See application file for complete search history.

(56) References Cited

U.S. PATENT DOCUMENTS

| 1,883,367 | A | 10/1932 | Gray |
| 3,630,757 | A | 12/1971 | Meid |
| 3,878,195 | A | 4/1975 | Taillie et al. |
| 4,293,574 | A | 10/1981 | Mikami et al. |
| 4,304,795 | A | 12/1981 | Takada et al. |
| 5,028,447 | A | 7/1991 | Schenk |
| 5,958,498 | A | 9/1999 | Trueck et al. |
| 6,194,016 | B1 | 2/2001 | Cui et al. |
| 6,479,083 | B1 | 11/2002 | Han et al. |
| 7,029,719 | B1 | 4/2006 | Nakajima et al. |
| 2003/0232117 | A1 | 12/2003 | Shaw |
| 2006/0029703 | A1 | 2/2006 | Shah |
| 2008/0003238 | A1 | 1/2008 | Sharafabadi |
| 2009/0098261 | A1 | 4/2009 | Park et al. |
| 2013/0059928 | A1 | 3/2013 | Dhalleine et al. |
| 2014/0017387 | A1 | 1/2014 | Segall et al. |
| 2014/0017388 | A1 | 1/2014 | Struffert et al. |
| 2014/0220219 | A1 | 8/2014 | Sass et al. |
| 2014/0272075 | A1 | 9/2014 | Sass et al. |
| 2014/0356507 | A1 | 12/2014 | Tetrick et al. |
| 2017/0049140 | A1 | 2/2017 | Regismond et al. |
| 2018/0317535 | A1 | 11/2018 | Bergwerff et al. |
| 2019/0116852 | A1 | 4/2019 | Kinkelaar et al. |
| 2019/0364941 | A1 | 12/2019 | Velikov et al. |
| 2019/0364948 | A1 | 12/2019 | Tetrick et al. |
| 2022/0022506 | A1 | 1/2022 | Bouwens et al. |

FOREIGN PATENT DOCUMENTS

| CA | 2508513 | 12/2007 |
| CL | 201602792 | 11/2016 |
| CL | 201602793 | 11/2016 |
| CN | 106174438 | 12/2016 |

(Continued)

OTHER PUBLICATIONS

Dhankhar, Homogenization Fundamentals, IOSR Journal of Engineering (IOSRJEN) www.iosrjen.org, ISSN (e): 2250-3021, ISSN (p): 2278-8719, vol. 04, Issue 05 (May 2014), ||V4|| pp. 01-08.*
Aghdaei et al.; Application of Isfarzeh seed (*Plantago ovate* L.) mucilage as a fat mimetic in mayonnaise; J Food Sci Technol; 2014; pp. 2748-2754; 51(10).
Zhen Ma, et al,; Advances in the Design and Production of Reduced-Fat and Reduced-Cholesterol Salad Dressing and Mayonnaise: A Review; Food Bioprocess Technol; 2013; pp. 648-670; 6.
Adeli Milani et al,; The Physico-Chemical Influences of Yellow Mustard Paste—Comparison with the Powder in Mayonnaise; J Food Process Technol; 2013; article 1000210, pp. 1-6; 4(3).
Tamm et al Functional properies of pea protein hydrolysates in emulsions and spray-dried microcapsules, Food Hydrocolloids; 2016; 204-214; vol. 58; Elsevier B.V.
Carvalho de Souza et al., A robust and universal NMR method for the compositional analysis of polysaccharides, Carbohydrate Polymers 95 (2013) pp. 657-663.
Search Report and Written Opinion in EP15194462, dated May 9, 2016.

(Continued)

Primary Examiner — Amber R Orlando
Assistant Examiner — Philip A Dubois
(74) Attorney, Agent, or Firm — N.V. Nederlandsch Octrooibureau

(57) ABSTRACT

The invention relates to a process for the manufacture of an aqueous dispersion comprising mustard bran comprising the following steps: providing an aqueous dispersion comprising mustard bran particles and applying a high pressure homogenisation treatment to alter the sugar moiety ratio of the mustard bran particles. The invention further relates to an oil-in-water emulsion comprising an aqueous dispersion that can be prepared by the aforementioned process.

13 Claims, No Drawings

(56) References Cited

FOREIGN PATENT DOCUMENTS

| | | |
|---|---|---|
| EP | 0788747 | 8/1997 |
| EP | 1405572 | 4/2004 |
| EP | 1796481 | 2/2013 |
| EP | 2589299 | 5/2013 |
| EP | 2745711 | 6/2014 |
| GB | 2404326 | 2/2005 |
| JP | 59106269 | 6/1984 |
| JP | 7031863 | 2/1995 |
| JP | 2015006148 | 1/2015 |
| JP | 2018011537 | 1/2018 |
| RU | 2303371 | 7/2007 |
| RU | 2015145385 | 4/2017 |
| WO | WO9005460 | 5/1990 |
| WO | WO 99/51106 | 10/1999 |
| WO | WO02067698 | 9/2002 |
| WO | WO2010098663 | 9/2010 |
| WO | WO2012089448 | 7/2012 |
| WO | WO2013067453 | 5/2013 |
| WO | WO2013092086 | 6/2013 |
| WO | WO2014095180 | 6/2014 |
| WO | WO2014124032 | 8/2014 |
| WO | WO 2015/169506 | 11/2015 |
| WO | WO2015169506 | 11/2015 |
| WO | WO2015169527 | 11/2015 |
| WO | WO2015184545 | 12/2015 |
| WO | WO2016172570 | 10/2016 |
| WO | WO2017080872 | 5/2017 |
| WO | WO2018007508 | 1/2018 |
| WO | WO2018122607 | 7/2018 |
| WO | WO2018153614 | 8/2018 |
| WO | WO2019057407 | 3/2019 |
| WO | WO2019057474 | 3/2019 |
| WO | WO2019115280 | 6/2019 |

OTHER PUBLICATIONS

Search Report and Written Opinion in PCTEP2016076328, dated Jan. 30, 2017.
Fleischerei, Bad Wrishofen, DE ; Hermey B et al, Characteristics of various types of mustard seed and their use in food manufacture; ISSN0015-3613; Jan. 1, 1994; .; vol. 45, No. 11; Germany.
Hermey et al.; Charakteristika Verschiedener Sensaat-Typen Und Deren Anwendung in Der Lebensmittelherstellung. Characteristics of Various Types of Mustard Seed and Their Use in Food Manufacture; Die Fleischerei; 1994; pp. 46, 48-50 (German version only).
Leszek Marszall; TitrationsmethodeMeasurement of the effective HLB value of nonionogenic surfactants by a phenol titration method; Parfumerie und Kosmetik; 1979; pp. 444-448; 60; Germany.
Dr. Otto-Albrecht Neumuller; Franck'sce Verlagshandlung, Stuttgart; Rompps Chemie-Lexikon; 1983; pp. 1750-1751, with English translation (total of 8 pages); 8th Edition; Germany.
Mailgaart, M. et al.; "The Spectrum Descriptive Analysis Method"; Sensory evaluation techniques; 1999; pp. 173-225; 3rd Edition.
Raymundo, A., et al.; White lupin protein as an ingredient to produce egg-free mayonnaise and salad dressings; Food Industry Journal ; 2002; pp. 322-329; vol. 5(4); .
Raymundo, A., et al.; Optimization of the Composition of Low-Fat Oil-in-Water Emulsions Stabilized by White Lupin Protein; JAOCS; 2002; pp. 783-790; 79(8).
Alderliesten, M.; "Mean Particle Diameters. Part II: Standardization of nomenclature"; Particle & Particle Systems Characterization; 1991; pp. 237-241; 8.
Munoz, A. M., et al.; "Universal, product and attribute specific scaling and the Development of common lexicons in descriptive analysis"; Journal of Sensory Studies; 1998; pp. 57-75; 13(1).
Cornelia, M., et al.; "The Utilization of Extract Durian (*Durio zibethinus* L.) Seed Gum as an Emulsifer in Vegan Mayonnaise"; Procedia Food Science; 2015; pp. 1-18; 3.
Fiery Chipotle Gormaise, Record ID 2666235; Mintel GNPD; 2014; 2 pages.
Premium Super Blue Cheese Dressing, Record ID 10139531; Mintel GNPD; 2003; 2 pages.
"Honey Mustard Mayonnaise"; www.mrsbridges.co.uk; retreived 2022; 1 page.
Papalamprou, et al.; "Effect of medium molecular weight xanthan gum in rheology and stability of oil-in-water emulsion stabilized with legume proteins"; Journal of the Science of Food and Agriculture; 2005; pp. 1967-1937; 85;.
Kim, S. Y., et al.; "Functional properties of proteolytic enzyme modified soy protein"; J. Agric. Food Chem.; 1900; pp. 651-656; 38(3).
Anonymous; "Emulsifier based on soy protein"; Food Engineering; 1979; pp. 32-33; 51(5).
Egi, N., et al.; "Rheological investigation of soybean protein emulsion and application to food products"; Journal of the Japanese Society for Food Science and Technology; 2016; pp. 225-235; 63(5).
Tabakaeva, O. V., et al.; "The use of new vegetable emulsifiers in the production of mayonnaise"; Maslozhirovaya Promyshlennost; 2013; pp. 30-32; 3.
Eida, T., et al.; "Development of mayonnaise-like food with soybean protein"; International Congress of Food Science & Technology; 1978; p. 128.
Sadovnichii, G.V., et al.; "Use of plant proteins in the production of mayonnaise"; Pishchevaya Promyshlennost; 1988; 1 page; 4.
Zagibalov, A.F., et al.; "Use of plant protein in mayonnaise production"; Pishchevaya Promyshlennost; 1983; pp. 38-39; 4.
Scott; Tripeptide Emulsifiers;Advanced Materials;pp. 1381-1386;2016; 2016; 1381-1386.

\* cited by examiner

PROCESS FOR THE MANUFACTURE OF AN AQUEOUS DISPERSION COMPRISING MUSTARD BRAN AND AQUEOUS DISPERSION COMPRISING MUSTARD BRAN

FIELD OF THE INVENTION

The present invention relates to a process for the manufacture of an aqueous dispersion comprising mustard bran, to an oil-in-water emulsion comprising such aqueous dispersion, and to a process for the manufacture of such an emulsion.

BACKGROUND TO THE INVENTION

Mustard seeds are an important ingredient in foods. They are the prime source for mustard, but also used as spice to prepare other foods such as mayonnaise. Various plant species provide mustard seeds: *Sinapis alba* and *Brassica hirta* (white and yellow mustard), *Brassica juncea* (brown Indian mustard or oriental mustard), and *Brassica nigra* (black mustard).

When mustard seeds are ground to powder in a mill, the outer layer separates out as mustard bran. Although, typically discarded as waste product, some commercial foods (like sauces) comprise mustard bran as ingredient. In particular, mustard bran can structure foods by affecting viscosity and water binding properties, as well as imparting visually detectable particulates in foods. Mustard bran is (commercially) available in particulate (powdered) form.

Mustard bran is thus a different material than whole mustard seed or mustard paste. The latter is essentially based on ground whole mustard seed or based on ground mustard seed from which the mustard bran has been previously removed. As such, the technology described in WO2014/124032A1 (Wisconsin spice) or US2014/0272075 (Wisconsin spice), both directed to providing an aqueous mustard paste, is not considered relevant or in the same technological field.

U.S. Pat. No. 3,630,757 describes a method for making an edible food composition having body, taste and mouth feel substantially similar to food products prepared from concentrated dispersions of tomato solids, comprising providing a fluid dispersion of mustard seed hulls, comminuting said fluid mustard seed hull dispersion to provide comminuted mustard seed hulls having a particle size of less than about 500 microns, and mixing said comminuted mustard seed hull dispersion with condiments and a gum so as to provide the edible food composition with body and mouth feel substantially similar to food products prepared from concentrated dispersions of tomato solids. The examples of the US patent describe the preparation of a tomato ketchup-like products in which mustard bran is mixed with vinegar, water, preservatives and spices, and the resulting mixture is twice passed through a colloid mill.

WO 2013/092086 describes an edible oil-in-water emulsion comprising finely ground pulse seed and rhamnogalacturonan mucilage gum originating from mustard bran. The examples of the international patent application describe the preparation of mayonnaise using a process in which mustard bran is mixed with water, lentil flour, sugar and salt, and wherein remaining ingredients (oil, vinegar, egg yolk) are admixed using a Silverson mixer or a Fryma Del mixer.

WO 2015/169527 describes an oil-in-water emulsion, comprising ground white or yellow mustard seed, wherein the ground white or yellow mustard seed is obtained by grinding white or yellow mustard seed in the presence of water and vinegar. Example 1 describes the preparation of an oil-in-water emulsion by mixing egg blend, mustard bran and aqueous phase in a pre-emulsion vessel and adding the oil under continuous stirring, followed by passing the pre-emulsion through a colloid mill for emulsification (rotation speeds between 7,000 and 14,000 rpm).

One of the problems observed with the use of mustard bran is that its structuring capacity and the organoleptic properties it provides can be suboptimal.

It is an object of the invention to provide a process to improve the structuring capacity of mustard bran, preferably to provide a simple process and/or a process requiring less energy.

It is a further object of the invention to provide an oil-in-water emulsion comprising mustard bran with improved structuring, in particular of the water-phase, and/or having improved organoleptic properties.

SUMMARY OF THE INVENTION

One or more of the objectives have been met by a high pressure homogenisation (HPH) treatment of mustard bran particles in water, which is indicated by a certain alteration in the sugar moiety composition of the mustard bran particle before and after the HPH treatment.

Therefore in a first aspect the invention relates to a process for the manufacture of an aqueous dispersion comprising mustard bran comprising the following steps:
  a) providing an aqueous dispersion comprising mustard bran, wherein the mustard bran comprises mustard bran particles, wherein the mustard bran particles have a sugar moiety profile in which the combined molar amount of galactose+mannose, is at least 0.85 times the molar amount of arabinose;
  b) applying shear to the dispersion provided at step a) using a high pressure homogenizer operating at a pressure drop of at least 300 bars to provide mustard bran particles having a sugar moiety profile in which the combined molar amount of galactose+mannose, is at most 0.80 times the molar amount of arabinose;
wherein the sugar moiety profile of the mustard bran particles is determined by isolating the mustard bran particles by means of centrifugation, hydrolysing the polysaccharides contained in the particles and analysing the sugar composition of the hydrolysed mustard bran polysaccharides by means of $^1$H-NMR, using the procedure specified in the description.

It will be appreciated that step a) can be very short. For example water and mustard bran particles having the sugar moiety profile as described at step a) can be combined and directly subjected to the HPH treatment as set-out at step b). For example, a separate stream of water and mustard bran particles as under step a) can be directly combined under suitable HPH conditions as set-out in step b).

The alteration in the sugar moiety profile of the mustard particles according to the process of the invention is indicative of sufficient release of structuring agent from the mustard bran particles into the water-phase to provide improved structuring and other effects.

Without wishing to be bound by theory it is believed that upon contact with water, mucilage can form around and remains largely attached to the mustard bran particle. (Hydrated) mustard bran particles as such (i.e. including the mucilage) comprises a variety of polysaccharides. Different types of polysaccharides can be distinguished based on characteristic monosaccharide moieties, like glucose, mannose, galactose, arabinose etc., resulting in a characteristic sugar composition for a given polysaccharide. The HPH treatment according to the invention is believed to release a certain part of the mucilage from the mustard bran particles. Released mucilage (i.e. not physically attached to the mustard bran particles) can be easily separated from the mustard bran particles for example by centrifugation. The released mucilage surprisingly comprises a certain subset of the polymers-types present in the original mustard bran particle and as such alters the sugar moiety profile of the remaining mustard bran particle.

Applicants observed that it is essential that the mustard bran (particles) are treated in the presence of a water-continuous system (i.e. as a dispersion of mustard bran in water) to obtain a sufficient alteration in the sugar moiety profile of the mustard bran particles. In comparison, multiple and/or prolonged cycles of dry grinding can reduce the particle size of the mustard bran, yet still lead to sub-optimal structuring of (post-added) water-phase.

Applicants observed that many factors can influence the effect of HPH treatment at step b) on the sugar moiety profile of the mustard bran particle. Factors such as homogenisation time, soaking time, soaking temperature, amount of shear, the presence of solutes, concentration of mustard bran particles, type of HPH device and operating conditions can all interact in complex ways to affect when (or if) a ratio is achieved as specified in step b). What is essential to the current invention is that the shear applied will lead to the ratio of sugars in the mustard bran particles as claimed in step b). Examples of suitable shear application conditions are given below.

In particular, the aqueous dispersion of mustard bran produced according to the process of the invention displays improved structuring (e.g. as indicated by a greater elasticity modulus (G') of the water-phase) when starting from the same concentration of mustard bran. In addition, the aqueous dispersion of mustard bran according to the invention shows improved organoleptic properties, such as improved smooth appearance, and (thick) mouth feel.

Therefore in a second aspect the invention relates to an oil-in-water emulsion comprising an oil phase and a water phase, wherein the water phase comprises 0.5 to 15 wt. % of mustard bran, wherein the mustard bran comprises released mucilage and mustard bran particles,
  wherein the mustard bran is derived from *Sinapis alba*; and
  wherein the mustard bran particles have a combined molar amount of galactose+mannose, which is at most 0.80 times the molar amount of arabinose.

The use of an aqueous dispersion comprising mustard bran in oil-in-water emulsions leads to improved structuring and improved organoleptic properties of the emulsion. A structured water-phase can be advantageously used to lower the amount of fat/oil in oil-in- water emulsions, such as mayonnaise without negative impact on stability and/or organoleptic properties.

A further aspect of the invention relates to a process of manufacturing an oil-in-water emulsion according to the present invention, said process comprising the manufacture of an aqueous dispersion as described herein, followed by the step of combining said aqueous dispersion with oil.

DETAILED DESCRIPTION OF THE INVENTION

All percentages, unless otherwise stated, refer to the percentage by weight (wt. %) based on the total weight of the final composition. Except in the operating and comparative examples, or where otherwise explicitly indicated, all numbers in this description indicating amounts or ratios of material or conditions of reaction, physical properties of materials and/or use are to be understood as modified by the word "about". It will be appreciated that the total amount of ingredients in the final product will not exceed 100 wt. %.

Wt. % of the mustard bran includes both the mustard bran particles and the mustard bran material released from the particles into the water-phase, unless otherwise specified.

With the term mustard bran is meant mustard seed material from which the mustard kernel has been (substantially) removed, although some trace amounts of kernel material may remain. It will be appreciated that mustard bran is therefore something else than whole mustard seed. (Untreated) mustard bran is commercially available in powdered (particulate) form.

Upon contact with water dry mustard bran particles typically exhibit some swelling, which will increase their particle size. Therefore, with the particle size distribution of the mustard bran particles is meant the size distribution after soaking in water for at least 8 hours.

The d(0.9) value is used to indicate the mustard bran particle size and is defined as the 90 volume % of the particles having the indicated size or lower. The d(0.9) value is measured as set out below in the Examples section.

The terms 'fat' and 'oil' are used interchangeably. Where applicable the prefix 'liquid' or 'solid' is added to indicate if the fat or oil is liquid or solid at ambient temperature as understood by the person skilled in the art. Ambient temperature is considered to be a temperature of about 20 degrees Celsius. Hardstock fat refers to a fat that is solid at ambient temperature as understood by the person skilled in the art. The terms 'hardstock fat', 'structuring fat' or 'hardstock' are used interchangeably. Fat as used in the present invention refers to edible triglyceride based fat as understood by the person skilled in the art. The terms 'triacylglycerols', TAGs', and 'triglycerides' are used interchangeably; they refer to esters of glycerol and three fatty acids. The fatty acid (moieties) of the TAGs may vary in length. The length of a fatty acid is commonly indicated by their carbon number. The fatty acid (moieties) may be saturated, mono-unsaturated or polyunsaturated.

*Sinapis alba* is also sometimes referred to as *Brassica alba* or *Brassica hirta*. The term *Sinapis alba* as used in this specification refers to *Sinapis alba, Brassica alba* and (/or) *Brassica hirta*.

Sugar Moiety Profile

The sugar moiety profile of the mustard bran particles has a ratio of the molar amount galactose+mannose versus arabinose. The amount of those sugars comprised by the particles is based on the amount of those sugars as such (e.g. as free sugar) plus the amount which can be released therefrom by hydrolysis (e.g. as moiety of larger molecule structures). Preferably the ratio of the molar amount of galactose+mannose versus arabinose of the mustard bran particles is determined based on the method as set-out in the Examples.

Process for the Manufacture of a Structured Aqueous Dispersion

Step a) can be performed by use of commercially available mustard bran source (e.g. 412, fine ground yellow mustard bran; Supplier: G.S. Dunn Limited (Hamilton, Ontario, Canada)). The mustard bran particles used at step a) should have a combined molar amount of galactose+mannose, which is at least 0.85 times the molar amount of arabinose. Said sugar ratio of the mustard bran particles is measured as set out below. Preferably the mustard bran particles (i.e. having such starting sugar moiety ratio before HPH treatment as according to the invention) are essentially derived from *Sinapis alba*.

Preferably the amount of mustard bran at step a) is from 0.5 to 15 wt. %, more preferably from 1 to 12 wt. % and even more preferably from 2 to 10 wt. %, based on the total weight of the aqueous dispersion at step a).

Preferably the HPH treatment at step b) is performed such that the mustard bran particles provided at step b) preferably have a molar amount of galactose plus mannose of at most 0.75 times, more preferably of at most 0.7, even more preferably at most 0.65, still even more preferably at most 0.63 and still even more preferably at most 0.60 times the molar amount of arabinose.

Preferably the mustard bran particles provided at step a) have a (galactose+mannose)/arabinose ratio which is at least 0.87, more preferably of at least 0.9, even more preferably of at least 0.95, still more preferably of at least 0.97 and still even more preferably of at least 1.05.

Any HPH device can be used at step b) which is suitable to enable release of material from the mustard bran particles as according to the process of the invention. Preferably at step b) a high-pressure homogenizer, such as GEA Niro Soavi Homogenizers (Parma, Italy) is used. High pressure homogenisation (HPH) is a mechanical process, which works by forcing a fluid material through a narrow gap (the homogenizing nozzle) at high pressure. The fluid material is subjected to high shear by the sudden restriction of flow under high pressure through a restrictive valve. Preferably a high-pressure homogenizer is used to apply the shear at step b) operating at a pressure drop of at least 400 bars, more preferably of from 500 to 2000 bars, even more preferably of from 600 to 1400 bars and still even more preferably of from 700 to 1000 bars.

Application of heat can further reduce the time, shear and/or energy required to sufficiently treat the aqueous dispersion comprising mustard bran particles. Therefore, preferably the temperature at step a) and/or step b) is at least 50 degrees Celsius, more preferably at least 60 degrees Celsius, even more preferably at least 70 degrees Celsius and even more preferably at least 80 degrees Celsius.

It was surprisingly found that subjecting the aqueous dispersion of mustard bran (only) at step a) to such elevated temperatures can already achieve a reduction in the time/energy required to provide the altered sugar moiety ratio of the particles at step b). As such, supplying additional heat at step b) to heat and/or maintain the mustard bran particles and water at elevated temperatures at step b) can be omitted, in case this is already performed at step a). As heating during shear treatment at step b) is more difficult than heating during step a) preferably said elevated temperatures are applied at step a).

On the one hand, a minimum time to apply the elevated temperatures will as mentioned further reduce the shear/energy/time required in the process to provide the aqueous dispersion of mustard bran according to the invention. On the other hand, it was observed that prolonged exposure to said temperatures typically does not lead to further optimization of the process and further increase energy expenditure. Another benefit of application of a minimum time to apply the elevated temperatures is that it will reduce the number of live microbes. Preferably the aqueous dispersion comprising mustard bran particles during the process according to the invention is subjected to said temperatures for at least 30 seconds, more preferably for 5 minutes to 1 hour, even more preferably for 10 to 45 minutes and still more preferably for 15 to 30 minutes.

The aqueous dispersion comprising mustard bran obtained by the present process can suitably be used as such or be diluted or concentrated before further use e.g. before making a final food product, depending on the desired structuring power and organoleptic properties desired.

As further indication that the aqueous dispersion comprising mustard bran is sufficiently shear-treated according to the process of the invention, the viscosity of the aqueous dispersion comprising mustard bran will increase. Preferably the HPH-treatment at step b) is performed such that when using 5 wt. % of mustard bran at step a) in (pure) water, the aqueous dispersion provided at step b) has an elastic modulus (G') of at least 30 Pa, more preferably of at least 35 Pa, even more preferably of at least 40 Pa, even more preferably of from 45 to 200 Pa and still even more preferably of from 50 to 120 Pa, as measured at 20 degrees Celsius. The elastic modulus (G') is measured as set out below in the Examples section.

Preferably the shear applied at step b) is such that it leads to a decrease in particle size. Preferably the mustard bran particles at step a) have a d(0.9) value of at least 750 microns, more preferably at least 800 microns, even more preferably at least 900 microns and still even more preferably at least 1000 microns. Preferably after the HPH treatment at step b) the mustard bran particles have a d(0.9) of at most 600 microns, more preferably of at most 500 microns, even more preferably of at most 400 microns, still even more preferably of at most 350 microns and still even more preferably of from 150 to 300 microns.

Said particle size reduction further improves the structuring capacity of the aqueous dispersion and of the other effects mentioned. Also it can be used as a further indication that suitable shear is applied to release material from the mustard bran particles to alter their sugar moiety ratio, although the principle consideration is the obtaining of the sugar moiety ratio of the mustard bran particles as specified at step b) of the process according to the invention. A further benefit of mustard bran particles having a d(0.9) of at most 500 microns is that they have little or no detectability in the sense of visual cues or particle feel in the mouth, which can further improve organoleptic properties.

Water-Phase

The water (water-phase) used in the process to provide the structured aqueous dispersion of mustard bran according to the invention can be prepared according to the standard way in accordance with the chosen ingredients as understood by the person skilled in the art. The water-phase may suitably contain a variety of food grade ingredients, such as salts, vitamins and minerals, preservatives, flavors, and emulsifiers.

Added Salt Sugar and/or Acid

It was observed that the presence of salt, sugar and/or acid added to the water-phase during the process to provide the aqueous dispersion comprising the treated mustard bran according to the invention can negatively affect the time/energy required. Preferably salt (e.g. sodium chloride) sugar and/or acid are not added to the dispersion at step a) and/or step b) of the process according to the invention. However, salt, sugar and/or acid can be added after step b) without detrimental effect. With 'added' is meant that some salt, sugar and/or acid is actively added. It will be appreciated that some salt, sugar and/or acid typically is naturally present e.g. in the mustard bran but this is not taken into consideration for this purpose. With sugar here are meant free sugars (e.g. mono-, or disaccharides) and not sugar moieties as part of larger complex organic structures in the mustard bran particles, such as polymers.

Preferably the amount of added salt at step a) and/or step b) is at most 5 wt. %, more preferably at most 3 wt. %, even more preferably at most 2 wt. %, still even more preferably at most 1 wt. % and still even more preferably at most 0.1 wt. % and still even more preferably essentially no salt is added. Examples of salt are sodium chloride, potassium chloride, calcium chloride and combinations thereof.

Preferably the amount of added sugar at step a) and/or step b) is at most 5 wt. %, more preferably at most 3 wt. %, even more preferably at most 2 wt. %, still even more preferably at most 1 wt. % and still even more preferably at most 0.1 wt. % and still even more preferably essentially no sugar is added. Examples of sugar are mono- and/or disaccharides, such as ribose, mannose, galactose, xylose, arabinose, glucose, sucrose, lactose, maltose and combinations thereof.

Preferably the amount of added acid at step a) and/or step b) is at most 5 wt. %, more preferably at most 3 wt. %, even more preferably at most 2 wt. %, still even more preferably at most 1 wt. % and still even more preferably at most 0.1 wt. % and still even more preferably essentially no acid is added. Examples of acid are citric acid, acetic acid, lactic acid, phosphoric acid, sorbic acid, benzoic acid or a combination thereof.

Preferably the combined amount of added salt, sugar and acid at step a) and/or step b) is at most 5 wt. %, more preferably at most 3 wt. %, even more preferably at most 2 wt. %, still even more preferably at most 1 wt. % and still even more preferably at most 0.1 wt. % and still even more preferably essentially no salt, sugar and acid is added.

Oil-In-Water Emulsion Comprising Structured Water-Phase

Another aspect of the invention to an oil-in-water emulsion comprising an oil phase and a water-phase,
- wherein the water phase comprises 0.5 to 15 wt. % of mustard bran,
- wherein the mustard bran comprises released mucilage and mustard bran particles,
- wherein the mustard bran is derived from *Sinapis alba*; and
- wherein the mustard bran particles have a combined molar amount of galactose+mannose, which is at most 0.80 times the molar amount of arabinose The oil-in-water emulsion according to the invention preferably comprises from 1 to 99 wt. %, more preferably 5 to 75 wt. %, even more preferably 10 to 50 wt. %, still even more preferably 12 to 45 wt. %, still even more preferably 15 to 40 wt. % and still even more preferably 17 to 35 wt. % of water-phase structured according to the invention, based on the total weight of the emulsion.

Preferably the amount of mustard bran comprised by the oil-in-water emulsion according to the invention is from 0.5 to 15 wt. %, more preferably from 1 to 12 wt. % and even more preferably from 2 to 10 wt. %, based on the total weight of the (final) water-phase of the emulsion. The total weight of the (final) water-phase refers to the combined weight of the mustard bran and water, which further includes any water-dissolved substances (e.g. dissolved salt, acid, sugar). For example, in the case of a mayonnaise, the 'total weight of the water-phase' would not include the weight of the oil droplets dispersed therein.

Expressed differently, the oil-in-water emulsion preferably comprises mustard bran in a concentration of 0.05 to 4.0 wt. %, more preferably in a concentration of 0.075 to 2.75 wt. % and most preferably in a concentration of 0.1 to 2.0 wt. %, based on the total weight of the (final) emulsion.

Preferably the water-phase of the oil-in-water emulsion according to the invention has an elastic modulus (G') of at least 30 Pa, more preferably of at least 35 Pa, even more preferably of at least 40 Pa, even more preferably of from 45 to 200 Pa and still even more preferably of from 50 to 120 Pa, as measured at 20 degrees Celsius. The elastic modulus (G') is measured as set out below in the Examples section.

Preferably the oil-in-water emulsion according to the invention further comprises preservatives and more preferably one or more preservatives of sodium benzoate, potassium benzoate, potassium sorbate, sorbic acid, benzoic acid, mixtures thereof. Preferably the emulsion according to the invention further comprises anti-oxidants and more preferably one or more anti-oxidants of tocopherol, ascorbic acid, ascorbyl palmitate, tertiary-butyl hydroquinone, mixtures thereof. Preferably the emulsion according to the invention further comprises chelators and more preferably one or more chelators of EDTA and its salts, citric acid, sodium tripolyphosphate, sodium carbonate, potassium carbonate, mixtures thereof.

Fat

The fat contained in the oil-in-water emulsion according to the invention preferably includes hardstock fat, liquid oil or a combination thereof and more preferably includes liquid oil.

Hardstock fat may be a single fat or a mixture of different fats. The hardstock fat may be of vegetable, animal or marine origin. The hardstock fat may comprise conventional oils and fats which may be of both animal and vegetable origin. Examples of sources of conventional oils and fats include coconut oil, palm kernel oil, palm oil, marine oils, lard, tallow fat, butter fat, soybean oil, safflower oil, cotton seed oil, rapeseed oil, poppy seed oil, corn oil, sunflower oil, olive oil, mustard oil, algae oil and blends thereof. For the purpose of this invention, algae oils are considered vegetable oils. Preferably at least 50 wt. % of the hardstock fat, based on total amount of hardstock fat, is of vegetable origin, more preferably at least 80 wt. % and even more preferably the hardstock fat essentially consists of hardstock fat of vegetable origin. The hardstock fat may be modified fat, such as fat, which is produced by fractionation, hydrogenation and/or interesterification. In particular fractionation and hydrogenation can be used to alter the melting profile and N-line profile of a fat. Preferably the hardstock fat according to the invention does not contain partially hydrogenated fats and more preferably contains no partially- or fully hydrogenated fats. Preferably the emulsion according to the invention comprises only natural hardstock fats.

The liquid oil may be a single oil or a mixture of different oils. Preferably at least 50 wt. % of the oil, based on total amount of oil, more preferably at least 80 wt. % and even more preferably essentially the oil; is oil of vegetable origin. The liquid oil fraction preferably comprises unmodified vegetable oil such as soybean oil, sunflower oil, linseed oil, low erucic rapeseed oil (Canola), corn oil (maize oil), olive oil, mustard oil, algae oil and blends of vegetable oils. For the purpose of this invention algae oil is considered vegetable oil.

In particular, it was observed that the structured aqueous dispersion comprising mustard bran according to the invention could be used to provide reduced fat emulsions without compromising on stability and/or organoleptic properties.

Preferably the fat content of the emulsion according to the invention is from 10 to 75 wt. %, more preferably of 30 to 72 wt. %, even more preferably from 40 to 70 wt. %, still even more preferably from 50 to 68 wt. %, still even more preferably from 60 to 68 wt. % and still even more preferably 64 to 68 wt. %.

Added Acid and pH

Preferably the oil-in-water emulsion according to the invention comprises edible acid. Said acid refers to regular acids typically used in food emulsions. Preferably the amount of added acid is from 0.1 to 10 wt. %, more preferably from 0.5 to 5 wt. % and even more preferably from 1.0 to 2.0 wt. %. The acid preferably is selected from acetic acid, citric acid, lactic acid, phosphoric acid, and combinations thereof. Acetic acid may be added as a component of vinegar, and citric acid may be added as a component of lemon juice. Preferably the pH of the emulsion according to the invention is from 2.75 to 5.75, more preferably from 2.85 to 5.50 and even more preferably from 3.25 to 4.25.

Added Thickeners/Gums

Many oil-in-water emulsions, in particular mayonnaise-type emulsions, with reduced fat levels contain added thickeners and/or gums to stabilise the water phase and to thicken the emulsion. Examples of such thickeners and/or gums are native starches, chemically modified starches, carrageenan, locust bean gum, carboxymethyl cellulose, pectin, the oligosaccharides and polysaccharides present in corn syrup or glucose syrup, ground pulse seed, cellulosic fibres like citrus fibres and tomato fibres, xanthan gum, agar, and alginate and gelatin. The advantage of the present invention is that the oil-in-water emulsion can be provided with added stability, without adding large amounts of non- mustard bran thickeners and/or gums to stabilise the aqueous phase. This is beneficial, as mustard bran is a consumer acceptable ingredient in foods and in particular in mayonnaise, not perceived as artificial, but as natural. In addition, it was observed that the combination of mustard bran according to the invention and other non-mustard bran thickeners and/or gums, and in particular starch, can negatively affect the organoleptic properties of the emulsion. Preferably the oil-in-water emulsion according to the invention comprises at most 2.0 wt. %, more preferably at most 1.0 wt. %, even more preferably at most 0.5 wt. % and still even more preferably at most 0.1 wt. % of added non-mustard bran thickeners and/or gums. And still even more preferably the emulsion according to the invention comprises essentially no added non-mustard bran thickeners and/or gums. In particular, preferably the emulsion according to the invention comprises at most 2 wt. %, more preferably at most 1.0 wt. %, even more preferably at most 0.5 wt. % and still even more preferably at most 0.1 wt. % of added starch. And still even more preferably the emulsion according to the invention comprises essentially no added starch. Said added starch can be modified starch. The term 'added' indicates purposefully added and does not encompass e.g. trace amounts of non-mustard bran gums/thickener present as impurities in based ingredients such as the liquid oil, preferably it also does not include gums and/or thickeners as found in egg (yolk).

Preferably the oil-in-water emulsion according to the invention is a mayonnaise or dressing and still even more preferably is a reduced-fat mayonnaise. Reduced fat mayonnaise preferably has a fat content of from 50 to 75 wt. %, more preferably of from 55 to 70 wt. %, even more preferably of from 60 to 68 wt. % and still even more preferably from 64 to 68 wt. %.

In case of the emulsion according to the invention is a mayonnaise, preferably the mayonnaise (as a whole) preferably has an elastic modulus (G') of at least 750 Pa, more preferably of from 800 to 1200 Pa and even more preferably of from 850 to 1000 Pa, as measured at 20 degrees Celsius. The elastic modulus (G') is measured as set out below in the Examples section.

Emulsifiers

The Hydrophilic-Lipophilic Balance (HLB) of an emulsifier is a measure of the degree to which it is hydrophilic or lipophilic. The HLB value is a parameter which is describing the solubility of the surfactant. The HLB value is a concept introduced by Griffin in 1950 as a measure of the hydrophilicity or lipophilicity of nonionic surfactants. It can be determined experimentally by the phenol titration method of Marszall; see "Parfumerie, Kosmetik", Vol. 60, 1979, pp. 444-448; and Rompp, Chemistry Lexicon, 8th Edition 1983, p. 1750. In case the emulsion according to the invention is an oil-in-water emulsion, preferably emulsifier is used having an HLB of from 8 to 15, more preferably of from 10 to 14 and even more preferably of from 11 to 13. Preferably said emulsifier is one or more of PEG 20 trioleate, PEG 20 monosterate, PEG 20 monooleate, PEG 20 monopalmitate and PEG 20 monolaurate sorbitan, derivatives thereof; protein (preferred protein are milk and/or soy-based protein), phospholipoprotein, whole egg, egg yolk and egg yolk derived phospholipoprotein modified with phospholipase A as disclosed in U.S. Pat. No. 5,028,447.

Preferably the amount of emulsifier used in the emulsion according to the invention is from 0.1 to 10.0 wt. %, more preferably from 0.5 to 8 wt. % and even more preferably from 1.5 to 6.5 wt. %.

Mayonnaise

Mayonnaise is generally known as a thick, creamy sauce that can be used as a condiment with other foods. Mayonnaise is a stable water-continuous emulsion of vegetable oil, egg yolk and either vinegar or lemon juice. In many countries the term mayonnaise may only be used in case the emulsion conforms to the 'standard of identity', which defines the composition of a mayonnaise. For example, the standard of identity may define a minimum oil level, and a minimum egg yolk amount. Also mayonnaise-like products having oil levels lower than defined in a standard of identity can be considered to be mayonnaises. These kind of products often contain thickeners like starch to stabilise the aqueous phase. Mayonnaise may vary in colour, and is generally white, cream-coloured, or pale yellow. The texture may range from of light creamy to thick, and generally mayonnaise is spoonable. In the context of the present invention 'mayonnaise' includes emulsions with oil levels ranging from 5% to 85% by weight of the product. Mayonnaises in the context of the present invention do not necessarily need to conform to a standard of identity in any country.

Traditionally full fat mayo typically comprises a limited set of ingredients like oil, egg (or derived ingredient), water, salt, acid and mustard (or derived ingredient) and spice. The typical fat content of traditional mayonnaise is about 77 wt. %. Reduced fat mayonnaise (i.e. having a lower amount of fat) requires additional water phase structuring to maintain product firmness. From a consumer perspective it is desirable that this structuring is achieved with ingredients that fall in any of the above mentioned ingredient categories without the need to introduce additional structuring ingredients like starches or gums and stabilizers that are not expected in a traditional mayonnaise formulations and in some cases need to be declared on the product label. Indeed, there has long been a need to provide a reduced fat mayonnaise, which remains stable and which does not compromise on other organoleptic qualities, such as smooth, glossy appearance and/or thick and creamy mouth feel. Preferably said reduced fat mayonnaise has little or no additional ingredients which are declared on the label other than those present in traditional mayonnaise. In fact, use of the structured aqueous dispersion comprising mustard bran according to the invention surprisingly improved some of the organoleptic properties, such as by providing a more thick mouth feel compared to the full-fat mayonnaise.

Dressings

Dressings are water-continuous emulsions, which are pourable and have a fat content of from 5 to 60 wt. %. Dressings can comprise a variety of other ingredients besides liquid oil and water. For example salad dressing such as Ranch dressing are often made of a combination of buttermilk, salt, garlic, onion, herbs (commonly chives, parsley, and dill), and spices (commonly black pepper, paprika, and ground mustard seed), which is then mixed with a mayonnaise or other oil emulsion sauce-base. Sour cream and yogurt are sometimes used as a substitute by some home cooks or to create a lower-fat dressing version. Dressing have many other culinary uses besides salad dressing such as for use as dip. Dressing according to the invention preferably comprise from 5 to 60 wt. % of vegetable oil. Preferably the dressings according to the invention have a pH of below 4.6 and more preferably of from 3.5 to 4.5. It was surprisingly observed that dressings comprising the aqueous dispersion according to the invention had improved physical, excellent organoleptic properties and are believed to provide superior consumer preference in comparable dip for celery sticks.

Preferably the oil-in-water emulsion according to the invention comprises:
from 5 to 85 wt. % of liquid oil; and
from 5 to 75 wt. % of structured aqueous dispersion according to the invention; and
from 0.1 to 10 wt. % of acid; and
from 0.5 to 10 wt. % of egg yolk; and
having a pH ranging from 3 to 5.

More preferably the oil-in-water emulsion comprises:
from 50 to 75 wt. %, preferably from 55 to 70 wt. %, more preferably from 60 to 68 wt. % and even more preferably of from 64 to 68 wt. % of liquid oil; and
from 0.1 to 10 wt. % of acid; and
from 10 to 45 wt. %, preferably from 15 to 40 wt. %, more preferably from 17 to 35 wt. % of structured aqueous dispersion according to the invention; and
from 0.5 to 10 wt. % of egg yolk; and
at most 0.5 wt. % of added non-mustard bran thickeners/gums; and
having a pH ranging from 3 to 5.

Production for the Manufacture of an Oil-In-Water Emulsion

Yet another aspect of the present invention relates to process for the manufacture of an oil-in-water emulsion according to present invention, said process comprising the manufacture of an aqueous dispersion as described herein, followed by the step of combining said aqueous dispersion with oil Preferably, the process comprises combining 25 to 88 parts by weight of the aqueous dispersion with 10 to 75 parts by weight of fat.

Preferred aspects described in the context of the first, second aspect or other aspects of the invention are applicable to the other aspects of the invention, mutatis mutandis unless explicitly stated otherwise. For example preferred particle size distribution of the mustard bran particles specified in relation to the process as provided at step b) also apply to the preferred particle size distribution of aqueous dispersion comprising mustard bran according to the invention and to food products according to the invention.

EXAMPLES

The following non-limiting examples illustrate the present invention.

Elasticity Modulus G' (Also Called Elastic or Shear Storage Modulus)

The elastic modulus G' is the mathematical description of a material's tendency to be deformed elastically (i.e., non-permanently) when a force or a deformation is applied to it. The term "storage" in terms of shear storage modulus refers to the storage of energy applied to the sample. The stored energy is recovered upon release of the stress or strain. The shear storage modulus or elastic modulus as it is also called, of a food emulsion or colloidal system is determined by dynamic oscillatory measurements, where the shear strain is varied (from low to high strain) in a sinusoidal manner at a frequency of 1 Hz. The resulting stress and the phase shift between the stress and strain is measured. From the amplitude of the stress and strain and the phase angle (phase shift) the shear storage modulus is calculated. Alternatively, instead of varying the shear strain the shear stress can be set and the shear strain measured. If the experiment is performed correctly, this should yield a similar result. These measurements are performed at 20 degrees Celsius after overnight storage at 20 degrees Celsius. A parallel plate geometry is used with a 40 mm diameter plate and 1 mm gap. Herein, the G' (Pa) is taken from the plateau region at low strain (linear viscoelastic region). For this measurement a rheometer can be used (e.g. TA AR2000EX, UK).

Mustard Bran Particle Pre-Treatment for Particle Size and Sugar Moiety Analysis

In case the mixture was not pourable, it was stirred with a spoon and diluted with Milli-Q water until pourable. A Centrifugation tube (500 ml nr. 355605, Beckman Coulter, Fullerton, Calif., USA) was filled with 350 gr of the mixture. The mixture was centrifuged for 10 minutes at 10,000*g in a Beckman Coulter Avanti J-26S XP centrifuge, with slow deceleration, after which the supernatant (including white, viscous substance on top of sediment) was discarded. Water was added to the sediment until a total of 350 gr in the centrifugation tube and the sediment was redispersed with a spatula and the mixture was shaken by hand until no particles larger than 2 mm were visible. The sedimentation and washing step was repeated to a total of 4 times. After the fourth centrifugation, the sediment was redispersed with a spatula in water, so as to obtain a spoonable slurry.

The particle size distribution of a sample of the slurry was analyzed as described below. The remainder of the slurry was freeze dried and the dried material was ground to a powder by hand using mortar and pestle. The ratio (Gal+Man)/Ara was determined as described below.

Mustard Bran Particle Size Distribution

To measure the particle size distribution, samples comprising mustard bran particles were diluted to approx 0.5% (w/w) with Milli-Q water, to a total of 10 ml in a 15 ml disposable conical tube from VWR (Cat. No. 89039-664). The tube was closed and shaken manually to remove material from the tube wall and to create a first crude dispersion and left overnight at 20 degrees Celsius. Subsequently the tube was agitated for 120 seconds using a Retsch Mix TM 01 Vortex mixer (Retsch, Haan, Germany) having the stirring speed indicator set at maximum speed. Just before adding the sample to the dispersing unit of the Mastersizer, the tube content was mixed using a disposable plastic 3 ml pipette. For particle size analysis a Mastersizer 2000 (Static light scattering) from Malvern Instruments (Enigma Business Park, Grovewood Road, Worcestershire WR14 1XZ, UK) was used. The Mastersizer was equipped with a Hydro 2000S dispersing unit. Dispersing unit was used at a room temperature of about 20 degrees Celsius. Total liquid volume of the dispersing unit was approximately 130 ml. The pump speed/stirrer of the unit was set at 1400 rpm and no ultrasound was used. Measurement- and background time were set at 12 seconds. A sample was added to the dispersing unit until the obscuration was between 7 and 8. Per aliquot 3 measurements were automatically done with a delay time of 10 seconds. For calculation of the particle size distribution the general purpose model of the Mastersizer 2000 software (version 5.60) was used, with enhanced calculation sensitivity, and spherical particle shapes assumed. For the dispersed phase a refractive index of 1.5 was used. For the water phase the refractive index of 1.33 was used. The averages of the 3 measurements were used to determine the particle size as characterised by the d(0.9) value.

Method for Determining the Ratio of Galactose+Mannose Versus Arabinose

This method is as described by de Souza et al. (Carbohydrate polymers, 2013, 95, 657-663), with a few adaptations: The pre-solubilization step was performed at room temperature. The sample concentration at the hydrolysis step was 14% (w/w) $D_2SO_4$ in $D_2O$. The hydrolysis duration was 180 min. The $^1$H-NMR spectra were recorded with a zg30 pulse sequence and a relaxation delay of 60 s. Approximately 15 mg of the freeze dried and powdered sediment was accurately weighed in a 15 mL glass culture tube. For pre-solubilization, 1 mL of 72% (w/w) $D_2SO_4$ in $D_2O$ was added to the sample. The sample was sealed and stirred at room temperature for 60 min. After this step, 6.2 mL $D_2O$ was added to the sample until the final concentration of 14% (w/w) $D_2SO_4$ in $D_2O$ was reached. The sample was sealed and incubated at 100° C. for 180 min. After the hydrolysis, the sample was allowed to cool down to room temperature. Subsequently 1 mL of maleic acid internal standard solution was added. The final solution was pipetted into a 3 mm NMR tube. The 1H NMR spectra were recorded at 290 K with an Avance III 600 MHz NMR-spectrometer equipped with a 5 mm cryoprobe. The NMR-spectra were recorded by using a standard pulse sequence (zg30). A relaxation delay of 60 s was used.

Organoleptic Property Measurement

A trained sensory panel was used to assess the food products. The sensory panel was trained to characterize products in terms of perceived attributes and intensities. The method of training used was a variation on the 'Spectrum' approach (Meilgaart, M. et al., Sensory evaluation techniques, Third Edition, p173 -225, 1999) and is based on the Product Specific Scaling Method (Munoz A. M. and Civille G. V., Universal, product and attribute specific scaling and the Develop of common lexicons in descriptive analysis, Journal of sensory studies, 13, p57 -75, 1998). The main features of the approach are:

Product specific scaling: scale intensities based on intensity of product type

Absolute scaling: using same scale (sour) references for all attributes on a 0-15 category scale making it possible to compare attribute intensities.

Products were offered blind to the panellists in full randomized design, each product was offered twice.

Effect of Different Shear Treatment on Bran Dispersions

Four mixtures were prepared as follows:

75 gr of Mustard bran (G.S. Dunn Fine Yellow Mustard Bran Powder #412) was put in a 2 liter polypropylene beaker (also used in the other examples of this application). 1425 gr Boiling water was added to the beaker and gently mixed with the bran, using a spoon.

This mixture was kept for 30 minutes at 90 degrees Celsius and gently stirred with a spoon every 5 minutes.

The mixture was cooled down to 20-30 degrees Celsius and water loss was replenished.

The shear treatment is set out in Table 1.

The mixture was cooled down to 20-30 degrees Celsius and water loss was replenished before measurement, the results of which are set out in Table 1.

TABLE 1

Shear treatment and results of aqueous dispersion of Comparatives A, B and Example 1 and 2. Particle size is measured in d(0.9) microns. The sugar ratios relate to the mustard bran particles.

| sample | shear | particle size | G' (Pa) | Organoleptic properties | (Gal + Man)/Ara |
|---|---|---|---|---|---|
| Comp. A | 10 min, by hand | 1354 | 8.2 | coarse + particles | 0.94 |
| Comp. B | 1 min, 7000 rpm Silverson | 1077 | 24.7 | coarse + particles | 0.85 |
| Ex. 1 | 10 min, 7000 rpm Silverson | 881 | 39.9 | coarse + particles | 0.67 |
| Ex. 2 | 1 min, 7000 rpm Silverson followed by 600 bar HPH | 292 | 71.9 | smooth | 0.57 |

The Silverson used was a model L4RT-A (Silverson Machines Ltd. Chesham Bucks, UK), which is also the Silverson mixer used in the other examples of this application. The HPH was a High Pressure Homogeniser (Niro Soavi Panda Plus 2000, GEA, Dusseldorf, Germany, which is also the HPH used in other examples.

Example 1 and 2 is according to the invention, also having a smoother appearance and improved structuring capacity as can be seen from the higher elastic modulus (G') than the Comparatives A and B.

Comparative C and D

Two comparative examples were prepared as above, but now 70 gr mustard bran was used in 1000 gr water. The shear treatment used is as set out in Table 2.

TABLE 2

Shear treatment and results of aqueous dispersion of Comparatives C and D. Particle size is measured in d(0.9) microns. The sugar ratios relate to the mustard bran particles.

| sample | shear | G' (Pa) | particle size | (Gal + Man)/Ara |
|---|---|---|---|---|
| Comp. C | 1 min, Silverson 2000 rpm | 42 | 1334 | 0.89 |
| Comp. D | 2 hours, Silverson 2000 rpm | 36 | 1344 | 0.81 |

From Comparative C and D it can be learned that prolonged shear does not necessarily imply increase in G' or decrease in particle size.

Pre/Post Addition of Salt, Sugar, and Acid

Four water-phases were prepared with a final composition as set out in Table 3.

TABLE 3

Final composition of Examples 3 to 6.

| Composition | Quantity (wt. %) |
| --- | --- |
| Mustard bran (G. S. Dunn #412) | 5.3 |
| NaCl (salt) | 3.8 |
| Sucrose (sugar) | 4.6 |
| 12 wt. % acetic acid solution | 9.2 |
| Water | balance |

Manufacturing Method of Example 3 to 6

Salt, sugar, and vinegar were either pre-dosed (added before application of shear) or post-dosed (added after application of shear treatment) as set out in Table 4. Mustard bran (G.S. Dunn #412) was put in a 2 litre beaker. The water (with pre-dosed solutes for Ex 3 and Ex 5) was boiled and added to the beaker containing the mustard bran and this mixture was gently mixed using a spoon. This mixture was kept for 30 minutes at 90 degrees Celsius and gently stirred with a spoon every 5 minutes. The mixture was cooled down to 20-30 degrees Celsius. The shear treatment was subsequently applied as set out in Table 4. For Ex. 4 and Ex. 6 the solutes were added after application of the shear treatment as set out in Table 4. Water loss was replenished. The mixture was sheared with Silverson for 5 minutes at 2000 rpm. The mixture was cooled down to 20-30 degrees Celsius.

TABLE 4

Shear treatment and results of aqueous dispersion of Examples 3 to 6. Particle size is measured in d(0.9) microns. The sugar ratios relate to the mustard bran particles.

| sample | shear | pre/post | G' (Pa) | particle size | (Gal + Man)/Ara |
| --- | --- | --- | --- | --- | --- |
| Ex. 3 | 20 min, Silverson 7000 rpm | pre | 65 | 1238 | 0.79 |
| Ex. 4 | 20 min, Silverson 7000 rpm | post | 154 | 707 | 0.68 |
| Ex. 5 | 1 min, Silverson, 5000 rpm followed by HPH 600 bar | pre | 130 | 407 | 0.62 |
| Ex. 6 | 1 min, Silverson 5000 rpm followed by HPH 600 bar | post | 142 | 366 | 0.60 |

It can be learned that the addition of salt, sugar, and acid to the water phase after the shear treatment (Examples 4 and 6) leads to a further improvement in terms of structuring capacity and particles size of the mustard bran particles.

Effect of Mustard Bran Concentration

Aqueous dispersion of mustard bran were prepared as according to Example 6, but with a different amount of mustard bran. The results on the aqueous dispersion properties obtained are set out in Table 5.

TABLE 5

Results of aqueous dispersion of Examples 7, 8 and 9. Particle size is measured in d(0.9) microns. The sugar ratios relate to the mustard bran particles.

| sample | mustard bran (wt. %) | G' (Pa) | particle size | (Gal + Man)/Ara |
| --- | --- | --- | --- | --- |
| Ex. 7 | 5.3 | 142 | 366 | 0.60 |
| Ex. 8 | 7.5 | 330 | 379 | 0.63 |
| Ex. 9 | 8.9 | 483 | 423 | 0.64 |

These results show that the process of the invention can be successfully applied to various starting levels of mustard bran, while yielding good results.

Mayonnaise Comprising Aqueous Dispersion of Mustard Bran

Three mayonnaises were prepared:
Comparative E: 75 wt. % fat mayonnaise
Comparative F: 65 wt. % fat mayonnaise with aqueous dispersion of mustard bran not according to the invention
Example 10: 65 wt. % fat mayonnaise with aqueous dispersion of mustard bran according to the invention.

Method of Manufacture of Comparative E, F and Example 10

Yellow mustard bran (G.S. Dunn #412) was dispersed in tap water at a concentration of 4.5 wt. % and heated in a Vorwerk Thermomix device (TM31), while stirred at setting 3-4 up to 90 degrees Celsius and then held at 90 degrees Celsius for 30 minutes. The vessel and slurry was weighted before and after the heating step and evaporative losses were compensated. After the heating the slurry was cooled down to below 30 degrees Celsius.

In Example 10, the aqueous dispersion was subsequently shear treated using a HPH type (Niro soavi NS1001H) at 600 bar. The resulting treated aqueous dispersion had a particle size distribution d(0.9) of about 220 microns and a (Gal+Man)/Ara estimated to be comparable to that of Example 1 (about 0.6). The aqueous dispersion of Comparative F was thus not subjected to substantial shear having and estimated to have a (Gal+Man)/Ara comparable to Comparative A or B (about 0.8). The cooled slurry of Example 10 and Comparative F (water for Comparative E) was weighed into a 5 liter beaker followed by addition of further ingredients as set out in Table 6.

TABLE 6

Composition of mayonnaises of Example 10 and Comparatives E and F. Amounts are in wt. %

| Sample | Comp. E | Comp. F | Ex. 10 |
| --- | --- | --- | --- |
| Aqueous dispersion of mustard bran | — | 22.2 | 22.2 |
| Water | 12.2 | — | — |
| Dry ingredients (sugar, salt) | 2.4 | 2.4 | 2.4 |
| Egg blend (mixture of whole egg and egg yolk) | 7.5 | 7.5 | 7.5 |
| Vegetable oil | 75.3 | 65.3 | 65.3 |
| Vinegar (12% acetic acid) | 2.6 | 2.6 | 2.6 |
| Total | 100 | 100 | 100 |

A Silverson L5M-A with standard general purpose disintegration head was used to mix all ingredients (except the oil) at low speed max 1000 rpm for 1-2 minutes. Next the vegetable oil was slowly added under controlled shear (shear up to 8000 rpm was gradually applied) to provide a pre-emulsion. The pre-emulsion was then acidified with vinegar to obtain a final pH between 3.6 and 3.8.

The acidified pre-emulsion was transferred into a colloid mill funnel (Colloid mill type: IKA Labor Pilot 2000/4 equipped with a MK head) and processed using a radial gap setting of 0.1 mm at speed of 6000-7000 rpm while keeping the temperature below 45 degrees Celsius. The flow rate of 30 kg/h was controlled by a small Retch mono pump connected to the colloid mill. Glass jars with airtight lids were filled with the mayonnaise and stored at ambient temperature. The oil droplet size distribution measured by light scattering method (Malvern) was below 3 microns (D3.2)

Analysis of the Mayonnaises of Example 10 and Comparatives E and F

The mayonnaises of Example 10 and Comparatives E, F all had a neutral taste, an off-white colour and were stable (when stored for 20 weeks at 20 degrees Celsius). The G' of the mayonnaises was measured based on the whole final mayonnaises, and also the mustard bran particles were analyzed of Example 10 and Comparative F (i.e. after pre-treatment as described to isolate and wash the particles). The particles of each mayonnaise were isolated as described above. Also the mayonnaises were subjected to organoleptic property measurement according to the method as described. In particular they were scored on fibers/particles visibility. The results thereof are set out in Table 7.

TABLE 7

Results of Mayonnaises of Example 10 and Comparative E and F. Particle size is measured in d(0.9) microns.

| sample | particle size | G' (Pa) | fibres/particles visibility score |
|---|---|---|---|
| Comp. E | no particles | 606 | 0.05 |
| Comp. F | 858 | 748 | 2.46 |
| Ex. 10 | 214 | 897 | 0.13 |

Description of the Samples by the Panelists

Comparative F: The fibers/particles of bran can be seen and felt in the mouth

Example 10: Fibers/particles were not visible nor felt.

These results show that the aqueous dispersion of mustard bran according to the invention can be applied to provide mayonnaise with reduced oil content. Furthermore said reduced fat mayonnaise according to the invention shows even improved smoothness when compared to full fat mayonnaise (Comparative E). Also the mayonnaise according to the invention has superior structuring and organoleptic properties when compared to the mayonnaise comprising mustard bran not according the invention (Comparative F).

The invention claimed is:

1. A process for the manufacture of an aqueous dispersion comprising mustard bran comprising the following steps:
   a) providing an aqueous dispersion comprising mustard bran, wherein the mustard bran comprises mustard bran particles, wherein the mustard bran particles have a sugar moiety profile in which the combined molar amount of galactose+mannose, is at least 0.85 times the molar amount of arabinose;
   b) applying shear to the dispersion provided at step a) using a high pressure homogenizer operating at a pressure drop of at least 600 bars to provide mustard bran particles having a sugar moiety profile in which the combined molar amount of galactose+mannose, is at most 0.75 times the molar amount of arabinose;
   wherein the sugar moiety profile of the mustard bran particles is determined by isolating the mustard bran particles by means of centrifugation, hydrolysing the polysaccharides contained in the particles and analysing the sugar composition of the hydrolysed mustard bran polysaccharides by means of $^1$H-NMR, using the procedure specified in the description.

2. The process according to claim 1, wherein the mustard bran is derived from *Sinapis alba*.

3. The process according to claim 1, wherein the amount of mustard bran at step a) is from 0.5 to 15 wt. %, based on the total weight of the aqueous dispersion at step a).

4. The process according to claim 1, wherein the temperature at step a), step b) or both at step a) and step b) is at least 50 degrees Celsius.

5. The process according to claim 1, wherein the particles provided at step b) have a d(0.9) value of at most 600 microns.

6. The process according to claim 1, wherein the shear applied at step b) is such that when at step a) a mixture of 5 wt. % of mustard bran and water is used, an aqueous dispersion is provided at step b) which has an elastic modulus G' of at least 30 Pa, as measured at 20 degrees Celsius.

7. The process according to claim 1, wherein the combined amount of added salt, sugar and acid at step a), step b) or a combination thereof is at most 5 wt. % salt, sugar and acid.

8. A process of manufacturing an oil-in-water emulsion comprising an oil phase and a water-phase, wherein the water phase comprises 0.5 to 15 wt. % of mustard bran, wherein the mustard bran comprises released mucilage and mustard bran particles, wherein the mustard bran is derived from *Sinapis alba*; and wherein the mustard bran particles have a combined molar amount of galactose+mannose, which is at most 0.75 times the molar amount of arabinose, said process comprising the manufacture of an aqueous dispersion according to claim 1, followed by the step of combining said aqueous dispersion with oil.

9. The process of claim 1, wherein the aqueous dispersion consists of mustard bran and water.

10. The process of claim 1, wherein the aqueous dispersion consists of mustard bran, water, and one or more of salt, sugar and acid, wherein the combined amount of salt, sugar and acid is at most 5 wt. %.

11. The process of claim 1, and further comprising:
   c.) mixing the aqueous dispersion from step b) with 64-85 wt. % of liquid oil, and from 0.1 to 10 wt. % of acid to form an oil-in-water emulsion having a pH ranging from 3 to 5
   d) homogenize the mixture from step c) to form an emulsion.

12. The process of claim 11, wherein step d) uses a colloid mill or a high pressure homogenizer.

13. The process of claim 1, wherein step a) provides an aqueous dispersion comprising 1-12 wt % mustard bran based on the total weight of the aqueous dispersion.

* * * * *